United States Patent
Arntfield et al.

(10) Patent No.: US 12,501,922 B2
(45) Date of Patent: Dec. 23, 2025

(54) CANOLA BASED TOFU PRODUCT AND METHOD

(71) Applicants: Susan Dorothy Arntfield, Winnipeg (CA); Lee Anne Murphy, Winnipeg (CA); William Francis Ross, La Salle (CA)

(72) Inventors: Susan Dorothy Arntfield, Winnipeg (CA); Lee Anne Murphy, Winnipeg (CA); William Francis Ross, La Salle (CA)

(73) Assignee: Manitoba Canola Growers Association Inc., Winnipeg (CA)

( * ) Notice: Subject to any disclaimer, the term of this patent is extended or adjusted under 35 U.S.C. 154(b) by 773 days.

(21) Appl. No.: 15/558,783

(22) PCT Filed: Feb. 18, 2016

(86) PCT No.: PCT/CA2016/050145
§ 371 (c)(1),
(2) Date: Sep. 15, 2017

(87) PCT Pub. No.: WO2016/154734
PCT Pub. Date: Oct. 6, 2016

(65) Prior Publication Data
US 2018/0070619 A1    Mar. 15, 2018

Related U.S. Application Data

(60) Provisional application No. 62/139,359, filed on Mar. 27, 2015.

(51) Int. Cl.
| | | |
|---|---|---|
| A23L 19/00 | (2016.01) | |
| A23J 3/14 | (2006.01) | |
| A23J 3/22 | (2006.01) | |
| A23L 5/20 | (2016.01) | |
| A23L 11/00 | (2021.01) | |
| A23L 11/45 | (2021.01) | |
| A23P 30/00 | (2016.01) | |

(52) U.S. Cl.
CPC ............. *A23L 19/09* (2016.08); *A23J 3/14* (2013.01); *A23J 3/22* (2013.01); *A23L 5/21* (2016.08); *A23L 11/05* (2016.08); *A23L 11/45* (2021.01); *A23P 30/00* (2016.08); *A23V 2002/00* (2013.01)

(58) Field of Classification Search
CPC . A23L 5/21; A23L 11/05; A23P 30/00; A23C 20/005; A23C 20/025; A23J 3/22; A23J 3/14
See application file for complete search history.

(56) References Cited

U.S. PATENT DOCUMENTS

| | | | | |
|---|---|---|---|---|
| 3,857,970 A * | 12/1974 | Tsumura | ............... | A23C 20/025 426/46 |
| 4,307,118 A * | 12/1981 | Kajs | ..................... | A23J 1/14 426/104 |
| 4,514,433 A * | 4/1985 | Matsuura | ............. | A23C 20/025 426/401 |
| 6,331,324 B1 * | 12/2001 | Tomita | ................. | A23C 20/025 426/634 |
| 2003/0125526 A1 * | 7/2003 | Barker | ...................... | A23J 1/14 530/370 |
| 2004/0156976 A1 * | 8/2004 | Adachi | ................ | A23C 20/025 426/634 |
| 2008/0317933 A1 * | 12/2008 | Williamson | ............ | A23L 19/01 426/629 |
| 2010/0234569 A1 * | 9/2010 | Helling | ..................... | A23J 1/14 530/350 |
| 2010/0303993 A1 * | 12/2010 | Motoyama | ............. | A23C 11/08 426/590 |

FOREIGN PATENT DOCUMENTS

| | | | | |
|---|---|---|---|---|
| EP | 988793 | * | 3/2000 | ............ A23C 11/10 |
| WO | WO 2008/090639 | * | 7/2008 | ............... A23L 1/36 |

OTHER PUBLICATIONS

Chae KR 10-0855080 Aug. 2008 ip.com translation 11 pages (Year: 2008).*
Shim et al. (KR 2005-0068463) ip.com translation 9 pages (Year: 2005).*
Rekha "Influence of processing parameters on the quality of soycurd (tofu)" p. 176-180 2011 (Year: 2011).*

* cited by examiner

*Primary Examiner* — Felicia C Turner
(74) *Attorney, Agent, or Firm* — McCarter & English, LLP

(57) ABSTRACT

The preparation of a tofu-like product from canola meal is taught, comprising placing ground canola meal in an aqueous solution to form an aqueous ground canola meal, separating insoluble materials from liquids of the aqueous ground canola meal to isolate a canola milk, heating the canola milk to induce protein unfolding, cooling the canola milk to allow coagulation, adding a coagulant to the canola milk to induce coagulation and removing liquid from the curd to produce a soft solid product.

21 Claims, No Drawings

CANOLA BASED TOFU PRODUCT AND METHOD

CROSS REFERENCE TO RELATED APPLICATION

This application is the National Stage entry under 35 U.S.C. § 371 of international Application Number PCT/CA2016/050145 filed on Feb. 18, 2016, published on Oct. 6, 2016 under publication number WO 2016/154734 A1, which claims the benefit of priority of U.S. Application Ser. No. 62/139,359 filed on Mar. 27, 2015, the contents of which are incorporated herein by reference.

BACKGROUND OF THE INVENTION

The global protein ingredients market represents a multi-billion dollar industry, dominated by dairy-based ingredients, egg, gelatin, soy-based, and wheat-based proteins. Food processors are shifting towards lower cost plant-based proteins due to rising costs of animal-based ingredients and growing demand for vegetable proteins. They are also seeking alternatives to soy and wheat proteins because of allergy and gluten concerns. Despite the increased demand for plant based proteins, their widespread use has been hindered by reduced solubility and functionality relative to animal-based proteins and strong flavors associated with some plant proteins.

Tofu is a highly nutritious, protein-rich food that is made from the curds of soybean milk. It is believed to have been invented in China around 2000 years ago. Basic tofu is a white, essentially bland, soft product.

Tofu production starts with a soybean soaking process to prepare the soybeans for extraction of soy protein. Whole, dry soybeans are saturated with water at ambient temperature for 10-14 hours although soybean flakes or "grits" can also be used. The soaked beans or flakes are ground. The ground soybean slurry is then cooked, typically with direct or indirect heat or steam up to 100° C. or 110° C. for 3 to 10 minutes. During the cooking process, soy protein is denatured and some of the volatile flavors are removed. The resultant soy slurry may be filtered to remove the soy pulp or fiber or the slurry may be filtered prior to cooking. The resulting product, referred to as soymilk, is then coagulated to form curds and whey. Whey is removed before or during pressing of the curds. The finished, pressed curds are referred to as tofu.

Tofu-like products have been made from a variety of non-soybean sources, for example, egg tofu, sesame tofu, peanut tofu and Burmese tofu (which uses yellow split pea flour and is set in a manner similar to soft polenta).

Canola meal, a by-product of canola oil processing, is high in protein and is typically used as a feed ingredient for livestock animals, due to its low cost.

Successful preparation of a canola based tofu has not previously been reported.

U.S. Pat. No. 3,966,971 teaches that solubilised residue of rapeseed (canola), can be separated from insoluble residue by acid extraction, centrifugation or filtration or a combination thereof, to produce a dry protein extract.

U.S. Pat. No. 6,800,308 to Maenz teaches a process for aqueous extraction, fractionation and enzymatic treatment of oil-extracted non- or lightly toasted flakes from rapeseed (canola), to produce a hard curd that can be pressed to form dried animal feed.

US Application No. 2008/0050497 to Mai et al. teaches a food composition containing a coagulated dried soy protein and a process for making the composition.

US Application No. 2009/0123629 to Chang et al. discloses a structured protein, including canola protein, which can be combined with tofu, soy whey, or soymilk and a coagulant to form a structured protein composition.

US Application No. 2014/0024714 to Wijesundera et al. discloses extracting oleosin from canola meal.

SUMMARY OF THE INVENTION

According to one aspect of the invention, there is provided a method of making a tofu-like canola meal food product comprising the sequential steps of:
 a) placing ground canola meal in an aqueous solution to form a aqueous ground canola meal;
 b) separating insoluble materials from liquids of the aqueous ground canola meal to isolate a canola milk;
 c) heating the canola milk at 90-100° C. to induce protein unfolding;
 d) cooling the canola milk to allow coagulation;
 e) adding a coagulant to the canola milk to induce coagulation; and
 f) removing liquid from the curd to produce a soft solid product.

The canola meal can be cold pressed canola meal, or canola meal cake.

Before step (a), the method can include grinding a quantity of canola to produce the canola meal. Fine ground meal is preferred, and more preferred is medium ground meal. Sieving can be done to remove larger fragments. If sieving is done, about a 500 µm to 0.5 mm sieve can be used. The canola meal can be ground by a hammer mill, a roller mill or a pin mill. The canola meal cake may be ground such that the hull fragments will be retained by a 0.5 mm sieve.

During soaking, the ground canola meal to water can be a ratio of 20:1 to 3:1, preferably 10:1 to 4:1, more preferably about 5:1.

The liquid can be removed by draining the mixture and/or pressing and/or filtration. The separation of liquids and solids can also be done by centrifugation.

The cooling can be done to a temperature of about 50-99 C, preferably 75-90 C. The aqueous ground canola meal can be soaked for 0.5-100 hours, preferably 6-30 hours, more preferably 20-24 hours.

The coagulant can be selected from the group consisting of: calcium sulfate; magnesium chloride; magnesium sulfate ($MgSO_4$), calcium chloride; glucono delta-lactone (GDL); acetic acid; citric acid; papain; vinegar, an alkaline protease; a neutral protease; and mixtures thereof. Preferably, the coagulant is selected from one or more of calcium sulfate anhydrous ($CaSO_4$), glucono delta-lactone (GDL), and a combination of the two coagulants. Preferably, the coagulant is between 0.5% and 5.0% (v/v) of the canola milk.

The invention also teaches a canola based food product obtained by the methods of the invention.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned are incorporated herein by reference.

Described herein is a method for the preparation of a tofu-like product from canola meal.

Canola meal, a by-product of canola oil processing is typically used as a feed ingredient for livestock animals.

Canola meal has not previously been used for preparation of a tofu-like product because of several concerns regarding the nature of the canola meal itself and the process of preparing tofu from soybean. Specifically, compared to whole soybean (typically used in tofu production), canola meal has lower protein content (31% for cold press canola meal; 36% for solvent extracted canola meal, compared to 45-60% crude protein for whole soybean), and much higher fiber content (15.7% crude fiber for cold press canola meal, versus 6% crude fiber for whole soybean). Accordingly, there were problems with coagulation of the canola proteins, as well as concerns regarding the difficulties in processing such a high fiber meal and the ability to form a suitable tofu cake from a meal having these characteristics. Furthermore, canola meal proteins are more soluble than soy meal proteins, which have prevented the preparation of a tofu-like product from canola meal, specifically, during the coagulation of the canola milk.

Assuming that a tofu-like product could be made from the high fiber, low protein content, high soluble protein canola meal, an additional consideration is the fact that canola meal cake has a dark, gritty appearance, meaning that the meal cake would be expected to produce a product with an unappetizing appearance as well as a gritty texture in the mouth. Furthermore, the canola meal also has a bitter taste, meaning that any tofu-like product produced therefrom would be expected to be unpalatable.

For conventional processing of canola, the seed is initially rolled or flaked. This ruptures cells and makes the oil easier to extract. Next the flaked or rolled seeds are cooked. Cooking thermally ruptures any oil cells that have survived flaking. It also reduces oil viscosity, which promotes oil collection, and inactivates the myrosinase enzyme which can hydrolyze glucosinolates found in canola resulting in undesirable breakdown products affecting oil and meal quality. Temperatures used during this stage range from 80-105° C., with an optimum temperature of about 88° C. The cooking cycle usually lasts 15-20 minutes.

The cooked canola flakes are then pressed in a series of screw presses or expellers which removes 50-60% of the oil while avoiding excessive pressure and temperature. The resulting compressed "cake fragments" undergo further processing to remove the remaining oil by treating the cake with hexane that is specially refined for the vegetable oil industry. After this process, the solvent is removed in a desolventizer-toaster. Most of the solvent is flashed from the meal by a heating process. The final stripping of the solvent is completed by injecting steam through the meal, a process called toasting. During the desolventization-toasting process, the meal is heated to 95-115° C. and moisture increases to 12-18%. This process takes about 30 minutes. The final stage involves blowing air through the meal to cool it and dry to about 12% moisture. It is then ground to a uniform consistency using a hammer mill, and then either pelletized or sold as a granular product to the feed industry.

Alternatively, canola oil can be extracted by cold pressing. Cold pressing does not involve heating of the canola seeds/meal before, during, or after the pressing process. Seeds are selected, cleaned, and rolled or crushed. The seeds are then mechanically pressed at a slow speed to limit friction and avoid elevating temperatures above 60° C. The screw presses are often water cooled to ensure the temperature of the pressed cake does not exceed 60° C. during mechanical processing. The resulting meal is much higher in oil than the meal obtained from conventionally processed canola.

The present inventor has found that, the canola meal cake used in the manufacture of the tofu-like product can be either a solvent-extracted canola meal cake or a cold press canola meal cake, although in preferred embodiments, cold press canola meal cake is used.

In an embodiment of the invention, there is provided a method of making a tofu-like canola meal food product which can comprise:

grinding a quantity of canola meal cake;

passing the ground canola meal cake through a 0.5 mm sieve, thereby removing hull fragments from the ground canola meal cake;

placing the ground meal cake in water, and optionally soaking for a period of time;

filtering the soaked ground meal cake, thereby isolating a canola milk concentrate;

heating the canola milk concentrate, optionally while agitating the canola milk concentrate;

adding a suitable coagulant to the heated canola milk concentrate;

cooling the canola milk concentrate and coagulant mixture;

draining the mixture, thereby producing canola curd; and pressing the canola curd into a tofu-like product.

The canola curd may be placed into a mold prior to pressing so that the tofu-like product has the desired shape.

The canola meal cake may be ground by any suitable means known in the art, for example, a hammer mill, a roller mill or a pin mill. Preferably, the canola meal cake is ground until the canola meal cake is in the form of individual particles and does not contain any clumps. Alternatively, the canola meal cake may be ground such that the hull fragments will be retained by a 0.5 mm sieve (that is, will not pass through a 0.5 mm sieve).

Sieving is not essential, as the solid parts of the meal will be separated from the canola milk in any event. However, for some canola meals (e.g. Landmark™), it is desirable to remove large pieces of non-protein material from the meal. If sieving, sieves between US Standard 4 (4.75 mm) and US Standard 35 (500 µm) can be used, and even larger. If sieving, sieve size in not critical.

In some embodiments, approximately 15% of the canola meal cake is removed by the sieving process. This 15% is composed primarily of hull fragments which are high in bran.

The present inventor has found that the ground meal cake can optionally be soaked for any suitable period of time, for example, for 6-30 hours, preferably 10-15 hours. Variations in soaking time have been used, ranging from 0 to 100 hours. Prolonged extraction generally does not result in more protein in the extracted milk. It is possible that materials in addition to protein are solubilized during the long process. Handling of the material can be more difficult with longer soaking times. This is believed to result from increased swelling of starch or fibrous material that may be present, making the separation step more of a challenge.

The present inventor has found that, the ground meal cake and the water may be mixed at any suitable ratio, for example from 10:1 to 4:1. If too little water is added, some of the soluble material may fall out of solution and be lost during filtering. Alternatively, if too much water is added, the canola milk may be too dilute to coagulate.

The milk is then separated from the meal. Separation of milk from the insoluble material, in particular the dark seed coat can be accomplished by a variety of techniques including filtration and centrifugation. Many different separation devices and methods will work. One preferred method is the use of a nut bag. Nylon mesh is easier to work with and removes more of the small black bits than, for example, cheese cloth. Centrifugation was also very effective.

The filtering of the soaked ground meal cake is carried out so that only the soluble material passes through the filter and insoluble material such as hull fragments are removed.

The canola milk concentrate may be heated to a temperature between 75-100° C., preferably to a temperature between 90-95° C. for an appropriate time. Preferably, the temperature of the canola milk is increased gradually, to promote coagulum formation. Once the canola milk reaches the desired temperature, the canola milk is removed from heat prior to the addition of the coagulant, as discussed below.

The present inventor tested multiple different coagaulants. The coagulant may be any suitable coagulant known for the production of tofu or similar products may be used in the invention. For example, the coagulant may be selected from the group consisting of: calcium sulfate; calcium chloride, magnesium sulfate, magnesium chloride; calcium chloride; glucono delta-lactone (GDL); acetic acid; citric acid; papain; an alkaline protease; a neutral protease; a vinegar, and mixtures thereof. Alternative salts of the coagulants may be used.

A combination of coagulants is generally preferred. Preferred coagulants are calcium sulfate and glucono delta-lactone (GDL). However, using 3% GDL only is particularly preferred, based on the quality of the resulting product. Yield is often higher with calcium sulfate, however, the solubility of $CaSO_4$ can be a concern as some of the precipitate $CaSO_4$ may contribute to the yield and leave a white powdery residue on the tofu like product. The coagulant may be added at 0.5-5.0% (v/v) of the heated canola milk. 1.5-3% is preferred. Yields were better with a 3% coagulant addition.

The conditions for the preparation of the canola meal tofu-like product may be varied to produce different results, specifically, different textures and firmness for the end product. For example, mixtures of the coagulants and different quantities of the coagulants, both individually and relative to one another may be used. For example, a combination of calcium sulfate and GDL produced an end product with a texture similar to silken tofu. Other firmness and textures can be obtained by varying the parameters discussed herein.

Calcium sulfate or calcium chloride may be used to produce a tofu-like product that is high in calcium whereas magnesium chloride may be used to produce a tofu-like product that is high in magnesium.

The ideal temperature to which the canola milk is heated and the temperature at which the coagulant is added may depend in part on the coagulant selected. For example, calcium sulfate may be added at a temperature of 85-90° C. and the mixture mixed at a temperature of 85° C.; a combination of calcium sulfate and GDL may be added at a temperature of 80° C. and the mixture mixed at a temperature of 80° C.; or GDL may be added at a temperature of 75-80° C. and the mixture mixed at a temperature of 75° C. Suitable temperatures for other coagulants and coagulant mixtures may be determined by following the methods described herein.

The invention will now be further illustrated by way of examples; however, the invention is not necessarily limited to the examples.

Example 1—Production of Canola Tofu

Canola press cake provided by the Food Development Centre in Portage La Prairie, Manitoba was used. The variety from which the seed cake was derived for this example was Invigor™ L150 Lot 0913 certified seed variety. The methods described herein are not specific for this variety and may be used with any canola variety.

TABLE 1

Proximate composition of canola seed and press cake

|  | Seed | Press Cake |
| --- | --- | --- |
| Fat (%) | 46.8 | 17.4 |
| Crude protein (%) | 19.6 | 31.5 |
| Crude ash (%) | 3.1 | 4.8 |
| Carbohydrate (%) | 22.5 | 35.0 |
| Moisture (%) | 8.0 | 11.4 |
| Energy (cal/100 g) | 590 | 422 |
| Energy (kJ/100 g) | 2468 | 1767 |

Food grade Calcium Sulfate Anhydrous ($CaSO_4$) and Glucono delta-Lactone (GDL) was purchased from Spectrum Laboratory Products in Gardena CA Grinding and Sieving to Reduce Amount of Hull Prior to working with the press cake it was further ground to pass through a 0.50 mm sieve. As the hull particles tended to be larger, as discussed above, hull particles were removed by the sieving process prior to the initial soak. Approximately 15% of the press cake was removed by this sieving step in this trial.

Canola Milk/Protein Extraction

The ground press cake was then soaked in water for approximately 16 hours (overnight). Ranges of press cake to water ratios were evaluated. A ratio of press cake to water of between 10:1 and 4:1 was found to be suitable. A ratio of 5:1 was used for those products that were evaluated in Example 2, below.

The mixture was filtered through a cloth lined with two layers of cheesecloth to obtain canola milk concentrate.

Tofu Procedure

The canola milk was slowly heated with gentle agitation to between 90° and 95° C. It was then removed from the heat and coagulant, which had been dissolved in water at a ratio of 5 parts water to 1 part coagulant and a temperature appropriate for the coagulant (Table 5). The mixture was then stirred gently for 30 seconds at the appropriate temperature (Table 2).

Gentle agitation kept the soluble protein in solution; however, too much agitation produces a froth or foam which will reduce yield as will no agitation (due to precipitation).

Once the coagulant was incorporated into the mixture, it was left to set at room temperature for 30 minutes and then transferred to refrigerator and set for an additional 1.5 hours.

The resulting coagulum was drained through 3-4 layers of cheesecloth for 2 to 3 hours to produce a curd. The curd, wrapped in two layers of cheesecloth, was transferred to a mold and pressed overnight in refrigerator. Press time was extended to 20 hours to create firmer texture.

TABLE 2

Addition and mixing temperatures for coagulants used in canola tofu prototypes

| Coagulant | Addition Temperature (° C.) | Mixing Temperature (° C.) |
|---|---|---|
| CaSO$_4$ | 85-90 | 85 |
| CaSO$_4$ + GDL | 80 | 80 |
| GDL | 75-80 | 75 |

Example 2—Evaluation of Canola Tofu Obtained with Variations on the Methodology

Texture Analysis

Texture was analyzed with a TA-XT Plus™ texture Analyzer (Texture Technologies, Hamilton MA) and associated software. A penetration system with a 126.45 mm$^2$ uniaxial compression ball, starting at a distance of 6.00 mm from the sample and compressing at a rate of 0.10 mm per second was used. Samples were held at refrigerated temperatures until tested to maintain consistent results.

The maximum applied force (firmness) and stress to strain ratio of elastic modulus (elasticity) were evaluated and are summarized in Table 3. Tests were performed on full size samples in triplicate.

TABLE 3

Texture analysis of canola tofu prototype samples in comparison to commercial soybean controls.

| Sample | Gradient (g/sec) | Force (g) |
|---|---|---|
| Control—Extra Firm commercial soy tofu | 7.22 | 435.29 |
| Control—Soft commercial soy tofu | 0.74 | 45.61 |
| Canola tofu with | | |
| 0.5% CaSO$_4$[a] | 1.79 | 109.03 |
| 1.5% CaSO$_4$ | 1.30 | 79.62 |
| 3% CaSO$_4$ | 1.95 | 118.65 |
| 5% CaSO$_4$ | 2.31 | 140.13 |
| 0.5% GDL | 0.78 | 48.25 |
| 1% GDL | 1.18 | 72.46 |
| 1.5% GDL | 1.14 | 70.08 |
| 0.75% CaSO$_4$ + 0.75% GDL | 0.74 | 46.25 |

Color Analysis

The colour of the canola tofu was measured using a Minolta cm-3500d spectrophotometer with Spectramagic Nx™ software. CIE lightness (L*), yellow-blue (a*) and red-green (b*) values were determined in triplicate. Results of these analyses are summarized in Table 4.

TABLE 4

Summarized results of color determination using CIE L*a*b* parameters

| Sample | L* | a* | b* |
|---|---|---|---|
| 0.5% CaSO$_4$[a] | 68.17 | 0.98 | 40.57 |
| 1.5% CaSO$_4$ | 68.62 | 1.19 | 38.59 |
| 3% CaSO$_4$ | 69.71 | 0.80 | 35.64 |
| 5% CaSO$_4$ | 70.84 | 0.08 | 32.91 |
| 1.5% CaSO$_4$ + GDL | 68.30 | 1.73 | 0.32 |
| 0.5% GDL | 67.86 | 1.59 | 41.63 |
| 1% GDL | 63.82 | 1.49 | 39.31 |
| 1.5% GDL | 67.61 | 1.88 | 42.76 |
| Control—Soft Soy Tofu | 88.34 | 0.47 | 18.70 |
| Control—Extra Firm Soy Tofu | 87.14 | 0.91 | 16.84 |

[a]All samples at 5:1 water to press cake ratio

Texture measurements indicated that it was possible to create a canola tofu with a texture similar to that seen for a commercial soft (or silken) tofu. This could be obtained either with 0.5% GDL or the combination of 0.75% CaSO$_4$ + 0.75% GDL, with values for the latter being closer to the commercial product. Firmer and more elastic gels could be obtain with CaSO$_4$, but even with levels of 5% CaSO$_4$ both firmness and elasticity were considerably lower than that seem for the hard commercial soy tofu.

The colour of the canola tofu was noticeably difference from the soy tofu; however, surprisingly, the colour was not as dark as expected. L* values ranged from 63 to 71 indicating a reasonably light product, but considerably lower than the soybean controls. A values were close to zero (a* scale goes from −80 to +80), suggesting little in the way of green and red colours; some were close to those for the control and some a little higher. The b* values were distinctive for the canola products and the high values were indicative of a strong yellow colour, which appeared to be a golden colour. The lowest b* value was obtained with the mixture of 0.75% CaSO$_4$ and 0.75% GDL, suggesting this may be the preferred combination for the preparation of a golden soft canola tofu.

Example 3—Production of Canola Tofu

Cold pressed canola meal was provided by the Manitoba Food Product Development Centre.

Canola Milk

Grinding and sieving was not necessary when using the cold press canola meal. The raw material was soaked for 0 to 24 hours with cold tap water at a ratio of 1:10 (w/v) or 1:5 (w/v) prior to blending; the 1:5 ratio is preferred due to a higher yield of Tofu produced. A 1:3 ratio has also been tried for all three raw materials (Cold Press Canola Meal, Extruded Canola Meal (Viterra™), and Solvent Extracted Canola meal (Fine fraction; Landmark Feeds), but after blending, the texture of the mixtures was too thick to extract milk.

The canola meal and water mixture was blended for 3 minutes at "liquefy" mode using an Oster™ blender. The slurry was then filtered and squeezed manually through a nut milk bag (Aviva™ Nut Milk Bag, made of sturdy nylon). Previously, cheese cloth was used, which performed well with respect to removing insoluble material, including bits of seed coat. Any cloth or polymer based filtration should have a similar effect. The milk was then heated to boiling (94° C.-100° C.) for 4 minutes with constant stirring. During heating, milk would get more turbid and milky, between room temperature and around 40-50 C. At around 50 C, coagula separation began, and this became more pronounced through the heating process.

Coagulation

Coagulants were prepared based on the volume of the milk, and coagulants were mixed with 5× their volume of water prior to mixing with the milk. For example, if the amount of milk was 500 ml and the concentration of coagulants 3%, the amount of coagulants needed was 500 ml*3%=15 g, plus 75 ml of water. The two coagulants can be used separately or in combination. Using $CaSO_4$ as a coagulants resulted a lighter coloured final products, and white powder residue in the final products. However, using $CaSO_4$ as a coagulant seemed to result in a higher yield. Milk was poured into the coagulants at 85° C.-90° C. for $CaSO_4$, and 75° C.-80° C. for GDL.

After the addition of coagulants, the mixture was set undisturbed for 3 hour at room temperature before filtering through one layer of cheese cloth. The curd was then pressed for 24 hours in a fridge (4° C.).

Example 4—Production of Canola Tofu

Solvent Extracted Canola Meal (Landmark Feeds) was used. The methods of Example 3 were followed, with the following modifications.

Sieving was performed as there was a substantial quantity of fiber and other debris in the sample provided. Three fractions were obtained:

a. Coarse—did not pass through a kitchen sieve—discarded
b. Medium—passed through kitchen sieve, but did not pass NO. 35 Mesh (500 μm) sieve
c. Fine—passed NO. 35 Mesh, <500 μm Both the medium and fine part of the canola meal can be used to extract milk. The fine fraction showed better promise. Protein extractions were lower than for the initial press cake and as a result, it was difficult to get a firm texture after pressing. This material looked more like a spread and may have potential in other applications.

Milk extracted from Solvent Canola Meal (Landmark Feeds) was darker than the milk extracted from using the cold press canola meal.

Example 5—Production of Canola Tofu

Extruded Canola Meal (Viterra) was obtained by oil extraction using extrusion. The methods of Example 3 were followed, with the following modifications.

Milk extracted from the Extruded Canola Meal from Viterra (finely ground when received) was darker than the milk extracted from using the cold press canola meal.

Two food grade coagulants used were:

1. Calcium Sulfate Anhydrous ($CaSO_4$)
2. Glucono delta-Lactone (GDL)

Both were from Spectrum Laboratory Products in Gardena CA and were of food grade.

Example 6—Production of Canola Tofu

Extruded Canola Meal (Viterra) was obtained by oil extraction using extrusion by traditional oil extraction method, heat treatment included. The methods of Example 5 were followed.

A thin layer appeared on the cheesecloth that could not be pressed. This was primarily due to the lack of solubility of the protein.

Example 7—Evaluation of Canola Tofu Obtained with Variations on the Methodology

TABLE 5

Tofu yield due to the use of different concentration of milk and coagulants

| sample | ratio | soaking time (h) | coagulants type | % | pressing time (h) | tofu yield |
|---|---|---|---|---|---|---|
| Cold Press Canola Meal | 1:10 | 22 h 20 min | $CaSO_4$ | 1.5 | 19 | 15.13% |
| Cold Press Canola Meal | 1:5 | 22 h 20 min | $CaSO_4$ | 3 | 70 | 28.44% |
| Cold Press Canola Meal | *1:10 | 19 h | GDL | 1.5 | 24 | 8.86% |
| Cold Press Canola Meal | *1:10 | 20 h | GDL | 3 | 24 | 11.51% |
| Cold Press Canola Meal | 1:10 | 20 h | GDL | 3 | 24 | 11.89% |
| Cold Press Canola Meal[c] | 1:5 | 20 h | GDL | 3 | 24 | 25.00% |
| Cold Press Canola Meal | *1:5 | 0 | $CaSO_4$ + GDL | 1.5 + 1.5 | 24 | 29.26% |
| Cold Press Canola Meal | *1:5 | 0 | GDL | 3 | 24 | 25.23% |
| Cold Press Canola Meal | *1:5 | 0 | $CaSO_4$ + GDL | 0.75 + 0.75 | 24 | 27.86% |
| Solvent Extracted Canola Meal (Fine) | *1:5 | 0 | $CaSO_4$ | 3 | 24 | 9.54% |
| Solvent Extracted Canola Meal (Fine) | *1:5 | 0 | GDL | 1.5 | 24 | N/A[a] |
| Solvent Extracted Canola Meal (Medium) | *1:5 | 0 | GDL | 1.5 | 24 | N/A[a] |
| Solvent Extracted Canola Meal | *1:5 | 0 | GDL | 3 | 24 | N/A[a] |
| Extruded Canola Meal | 1:10 | 20 | $CaSO_4$ | 1 ... 5 | N/A[b] | N/A[b] |

*Freshly made milk
[a]After pressing, texture looked sticky and more like a spread, could not determine the yield
[b]Coagula was too fine and in very dark color, can pass through cheese cloth. Whey color looks yellow and milky.
[c]Colour was determined on the 3% GDL sample. Values were: L* = 67.04 ± 0.81, a* = 1.74 ± 0.12, b* = 43.11 ± 0.77; these values were comparable to those reported in example 2.

TABLE 6

Protein Concentration V.S. Soaking Time

| Sample | Ratio | Soaking time (h) | Protein Conc. (mg/ml) |
|---|---|---|---|
| Cold Press Canola Meal | 1:10 | 6 | 2.721 |
| Cold Press Canola Meal | 1:10 | 20 | 4.269 |
| Cold Press Canola Meal | 1:10 | 24 | 4.279 |
| Cold Press Canola Meal | 1:10 | 48 | 3.935 |
| Cold Press Canola Meal | 1:10 | 72 | 2.588 |

TABLE 7

Protein Concentration in Extracted Milk

| Sample | Ratio | Soaking time | Protein Conc. |
|---|---|---|---|
| Cold Press Canola Meal | 1:10 | 20 | 3.222 |
| Cold Press Canola Meal | 1:10 | 0 | 3.723 |
| Solvent Extracted Canola Meal (fine) | 1:5 | 0 | 2.343 |
| Solvent Extracted Canola Meal | 1:5 | 0 | 1.949 |
| Extruded Canola Meal | 1:5 | 20 | 0.623 |

The scope of the claims should not be limited by the preferred embodiments set forth in the examples, but should be given the broadest interpretation consistent with the description as a whole.

The invention claimed is:

1. A method of making a tofu-like canola meal food product comprising the sequential steps of:
   a) placing ground canola meal in an unheated aqueous only solution to form an aqueous ground canola meal;
   b) separating insoluble materials from liquids of the aqueous ground canola meal to isolate a canola milk;
   c) heating the canola milk to 75-100 C to induce protein unfolding;
   d) cooling the canola milk to about 70-90 C to allow coagulation;
   e) adding a coagulant to the canola milk to induce coagulation such that a curd is formed, the coagulant added at about 3% (v/v) of the canola milk; and
   f) removing liquid from the curd to produce a soft solid product.

2. The method as claimed in claim 1, wherein the canola meal is cold pressed canola meal.

3. The method as claimed in claim 1, wherein the canola meal is canola meal cake.

4. The method as claimed in claim 1, further comprising, before step (a), grinding a quantity of canola to produce the canola meal, wherein the grinding is fine or medium grinding.

5. The method as claimed in claim 4, wherein the grinding is fine grinding.

6. The method as claimed in claim 1, further comprising, before step (a), sieving the canola meal to remove larger fragments, using about a 500 µm to about a 4.75 mm sieve.

7. The method as claimed in claim 1, wherein the removing liquid is done by draining the mixture.

8. The method as claimed in claim 1, wherein the removing liquid is done by pressing.

9. The method as claimed in claim 1, wherein the separating is done by filtration.

10. The method as claimed in claim 1, wherein the separating is done by centrifugation.

11. The method as claimed in claim 1, wherein the heating is done to a temperature of about 90-95 C.

12. The method as claimed in claim 1, wherein the cooling is done to a temperature of about 75-90 C.

13. The method according to claim 1 wherein the aqueous ground canola meal is soaked for 0.5-100 hours.

14. The method according to claim 13 wherein the aqueous ground canola meal is soaked for 20-24 hours.

15. The method according to claim 1, wherein the aqueous ground canola meal's meal to water is a ratio of 1:10 to 1:4.

16. The method according to claim 1 wherein the coagulant is selected from the group consisting of: calcium sulfate; magnesium chloride; magnesium sulfate ($MgSO_4$); calcium sulfate anhydrous ($CaSO_4$); calcium chloride; glucono delta-lactone (GDL); acetic acid; citric acid; papain; vinegar; an alkaline protease; a neutral protease; and mixtures thereof.

17. The method as claimed in claim 16, wherein the coagulant is selected from the group consisting of calcium sulfate anhydrous ($CaSO_4$), glucono delta-lactone (GDL), and a combination thereof.

18. The method according to claim 4 wherein the canola meal cake is ground such that the hull fragments will be retained by a 0.5 mm sieve.

19. The method according to claim 1, wherein the heating is gradual.

20. The method according to claim 1, wherein the coagulant in (e) is added at more than 2% (v/v) and about 3% (v/v) of the canola milk.

21. The method according to claim 1, wherein no additional heating is applied while the coagulant in (e) is added.

* * * * *